United States Patent
Riad

(10) Patent No.: US 10,946,775 B2
(45) Date of Patent: Mar. 16, 2021

(54) VEHICLE SEAT STORAGE SYSTEM

(71) Applicant: Honda Motor Co., Ltd., Tokyo (JP)

(72) Inventor: Yousuf S. Riad, Ostrander, OH (US)

(73) Assignee: Honda Motor Co., Ltd., Tokyo (JP)

(*) Notice: Subject to any disclaimer, the term of this patent is extended or adjusted under 35 U.S.C. 154(b) by 70 days.

(21) Appl. No.: 16/379,187

(22) Filed: Apr. 9, 2019

(65) Prior Publication Data

US 2020/0324671 A1  Oct. 15, 2020

(51) Int. Cl.
*B60N 2/30* (2006.01)
*B60N 2/015* (2006.01)

(52) U.S. Cl.
CPC ........ *B60N 2/3011* (2013.01); *B60N 2/01508* (2013.01); *B60N 2/3075* (2013.01); *B60N 2/3097* (2013.01)

(58) Field of Classification Search
CPC .. B60N 2/01508; B60N 2/062; B60N 2/0735; B60N 2/0742; B60N 2/0745; B60N 2/0747; B60N 2/30; B60N 2/3097; B60N 2/3075; B60N 2/3011; B60N 2002/022
USPC .............................. 296/65.01, 65.03; 297/14
See application file for complete search history.

(56) References Cited

U.S. PATENT DOCUMENTS

| | | | | |
|---|---|---|---|---|
| 1,369,633 A * | 2/1921 | Hibbard | ................ | B60N 2/3011 297/51 |
| 4,527,828 A * | 7/1985 | Groce | .................. | B60N 2/3031 296/63 |
| 5,984,397 A * | 11/1999 | Dawson | ............... | B60N 2/2222 296/65.09 |
| 6,270,140 B1 | 8/2001 | Opfer et al. | | |
| 6,460,922 B1 * | 10/2002 | Demick | ............... | B60N 2/3034 296/65.11 |
| 6,869,138 B2 | 3/2005 | Rhodes et al. | | |
| 6,883,854 B2 | 4/2005 | Daniel | | |
| 6,959,960 B2 | 11/2005 | Buccinna et al. | | |
| 7,040,685 B2 | 5/2006 | Sumida et al. | | |
| 7,108,306 B2 | 9/2006 | Suda et al. | | |
| 7,393,038 B2 * | 7/2008 | Yajima | ............... | B60N 2/01583 296/64 |
| 7,452,019 B1 | 11/2008 | Day | | |

(Continued)

FOREIGN PATENT DOCUMENTS

| EP | 1040960 A1 * | 10/2000 | ........... B60N 2/3043 |
|---|---|---|---|
| JP | 2011251644 | 12/2011 | |

(Continued)

*Primary Examiner* — Gregory A Blankenship
(74) *Attorney, Agent, or Firm* — Rankin, Hill & Clark LLP

(57) ABSTRACT

A vehicle seat storage system includes a passenger seat including a seatback and a seat base. The seat has a seating condition where the seat is releasably attached to a floor of the vehicle and a stowed condition where the seat is unattached from the floor and the seat base is folded against the seatback. The seat includes risers pivotally attached to the seat base. The risers have a deployed position for supporting the seat base in the seating condition and a folded position where the risers are folded inwardly against the seat base in the stowed condition. An interior sidewall of the vehicle includes a recessed portion sized and configured to receive the seat in the stowed condition. The interior sidewall includes a guide configured to direct the seat in the stowed condition into and out of the recessed portion and support the seat in recessed portion.

20 Claims, 9 Drawing Sheets

(56) References Cited

U.S. PATENT DOCUMENTS

| | | |
|---|---|---|
| 7,686,367 B2 | 3/2010 | Neale |
| 7,753,428 B2 | 7/2010 | Kato et al. |
| 7,954,873 B2 * | 6/2011 | Abe .................. B60N 2/366 |
| | | 296/65.05 |
| 8,011,714 B2 * | 9/2011 | Parkinson ............ B60N 2/3077 |
| | | 296/65.03 |
| 8,287,037 B2 | 10/2012 | Sayama |
| 8,291,734 B2 | 10/2012 | Kan et al. |
| 8,313,146 B2 | 11/2012 | Wagner et al. |
| 8,388,054 B2 | 3/2013 | Sayama |
| 8,590,970 B2 | 11/2013 | Takakura et al. |
| 8,708,392 B2 | 4/2014 | Otsuka et al. |
| 8,757,719 B2 | 6/2014 | Hayakawa |
| 8,770,659 B2 * | 7/2014 | Isherwood ......... B64D 11/0691 |
| | | 297/14 |
| 8,894,031 B2 | 11/2014 | Sailer et al. |
| 8,973,965 B2 | 3/2015 | Zalan et al. |
| 9,669,740 B2 | 6/2017 | Hansen et al. |
| 9,908,445 B2 | 3/2018 | Park et al. |
| 10,065,540 B1 | 9/2018 | Dry et al. |
| 2003/0184129 A1 * | 10/2003 | Honda ................ B60N 2/3043 |
| | | 297/14 |
| 2006/0255613 A1 | 11/2006 | Holmes et al. |
| 2008/0169668 A1 | 7/2008 | Muramatsu |
| 2009/0127904 A1 * | 5/2009 | Yamada .................. B60N 2/68 |
| | | 297/284.1 |
| 2010/0102585 A1 * | 4/2010 | Kato ....................... B60N 2/22 |
| | | 296/24.34 |
| 2010/0117393 A1 * | 5/2010 | Yamashita ......... B60N 2/01591 |
| | | 296/37.8 |
| 2018/0057169 A1 * | 3/2018 | Phi ....................... B60N 2/305 |
| 2018/0194252 A1 | 7/2018 | Sack et al. |

FOREIGN PATENT DOCUMENTS

| | | |
|---|---|---|
| JP | 2013039849 | 2/2013 |
| JP | 2013180678 | 9/2013 |
| JP | 2013244940 | 12/2013 |
| JP | 5678839 | 3/2015 |
| JP | 2019064307 | 4/2019 |

\* cited by examiner

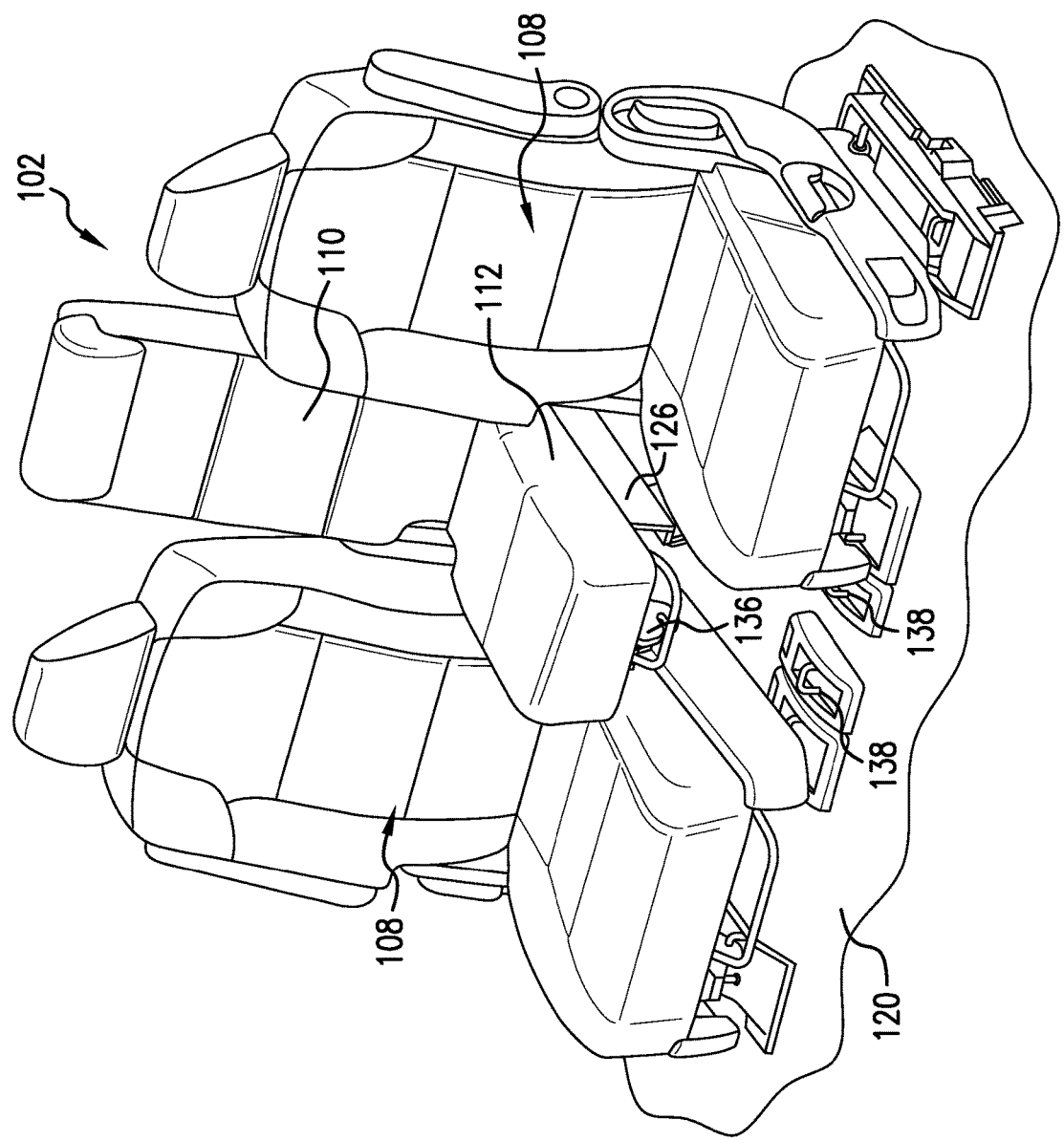

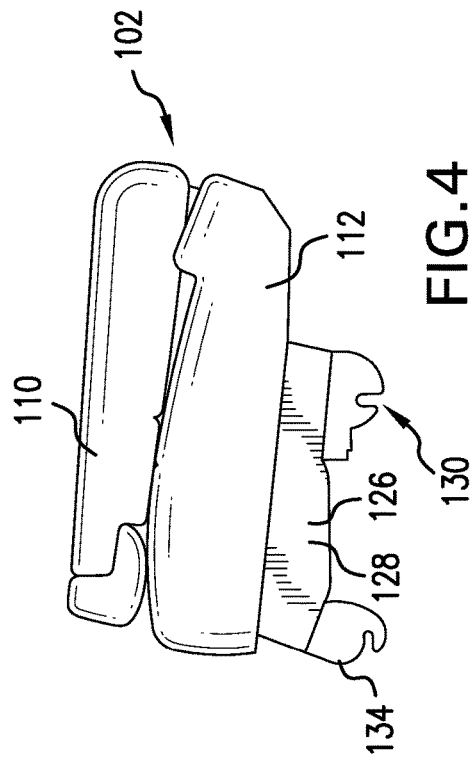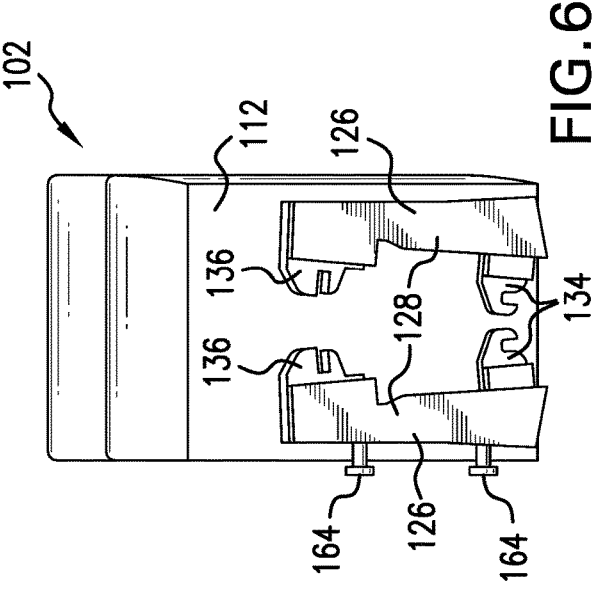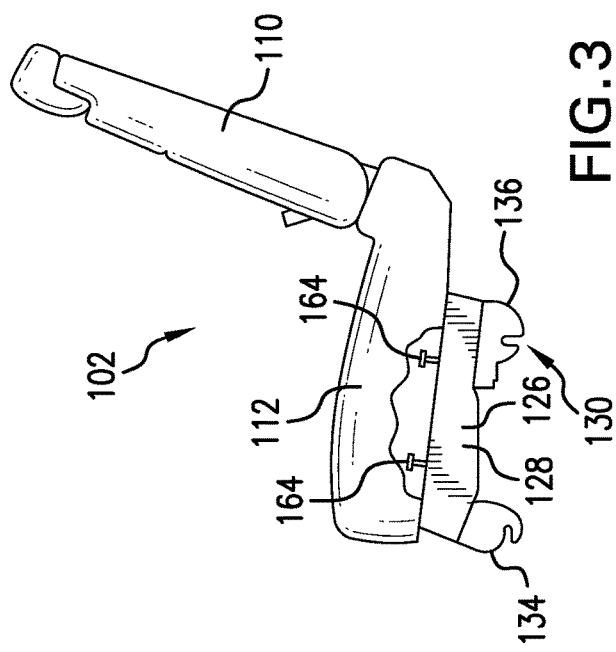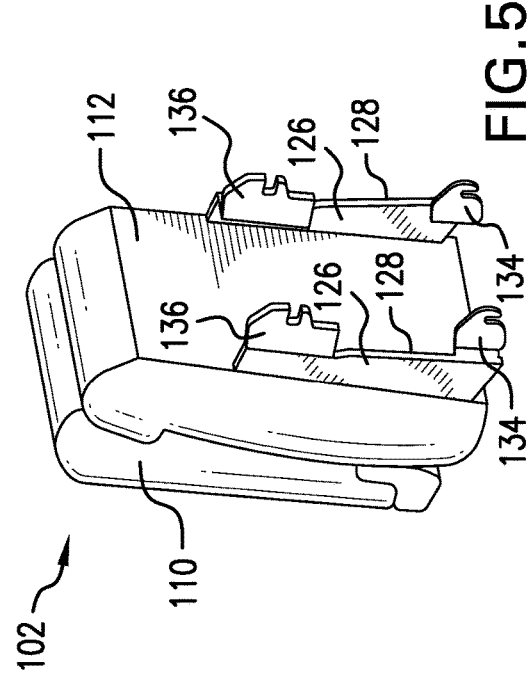

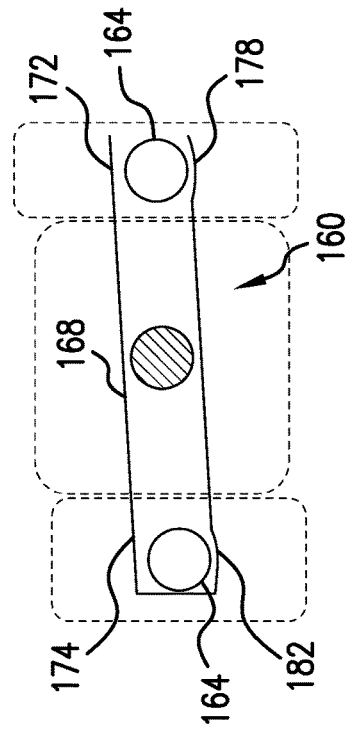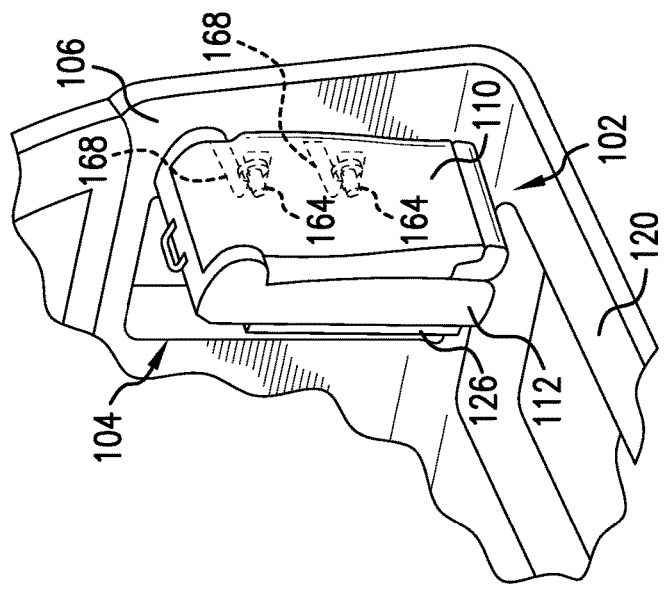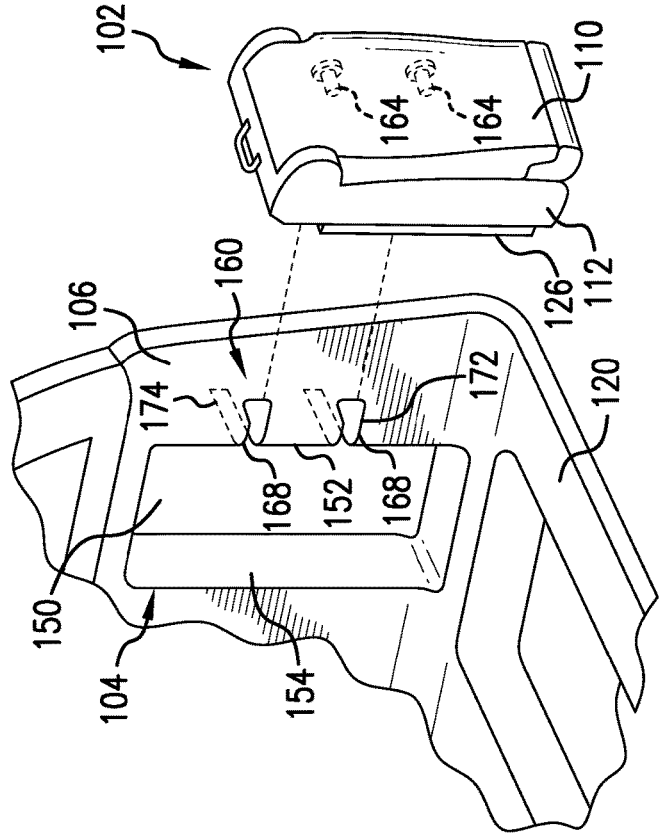

VEHICLE SEAT STORAGE SYSTEM

BACKGROUND

A seating assembly in a vehicle typically occupies a considerable amount of the interior cargo space in the vehicle. To maximize this cargo space behind a front driver seat, passenger seats, etc., the use of removable seats is known. Generally, the removable seats fold into a stowed configuration and are either removed from the vehicle, placed on a cargo floor, or at least partially stowed in a sub-floor cargo space. However, a system for stowing a removable seat that would allow for the removable seat to be stored within the interior cargo space, and yet not occupy any floor or sub-floor cargo space, would be desirable.

BRIEF DESCRIPTION

According to one aspect, a vehicle seat storage system comprises a passenger seat including a seatback and a seat base pivotally coupled to the seatback. The seat has a seating condition where the seat is releasably attached to a floor of the vehicle and a stowed condition where the seat is unattached from the floor and the seat base is folded against the seatback. The seat further includes risers pivotally attached to the seat base. The risers have a deployed position for supporting the seat base in the seating condition and a folded position where the risers are folded inwardly against the seat base in the stowed condition. An interior sidewall of the vehicle includes a recessed portion sized and configured to at least partially receive the seat in the stowed condition. The interior sidewall further includes a guide configured to direct the seat in the stowed condition into and out of the recessed portion and support the seat in recessed portion.

According to another aspect, a vehicle seat storage system comprises a passenger seat including a seatback and a seat base pivotally coupled to the seatback. The seat has a seating condition where the seat is releasably attached to a floor of the vehicle and a stowed condition where the seat is unattached from the floor and the seat base is folded against the seatback. An interior sidewall of the vehicle includes a recessed portion sized and configured to at least partially receive the seat in the stowed condition. The interior sidewall further includes a guide. The seat in the stowed condition is configured to slide along the guide in a downward direction toward the vehicle floor to a stowed position within the recessed portion.

According to another aspect, a method for storing a passenger seat in a vehicle comprises providing a passenger seat having a seating condition where the seat is releasably attached to a floor of the vehicle and a stowed condition where the seat is unattached from the floor; providing an interior sidewall of the vehicle with a recessed portion sized and configured to at least partially receive the seat in the stowed condition; providing a guide mounted to or formed in the interior sidewall for directing the seat in the stowed condition into the recessed portion; folding a seatback of the seat against a seat base of the seat; detaching the folded seat from the floor; mounting the seat in the stowed condition to the guide; and moving the seat in the stowed condition into the recessed portion via sliding movement of the seat in the stowed condition along the guide.

BRIEF DESCRIPTION OF THE DRAWINGS

FIG. 2 depicts the seating arrangement of FIG. 1 with one of the passenger seats being removed.

FIG. 3 is a side view, partially broken away, of the removed passenger seat of FIG. 2.

FIGS. 4 and 5 depict the passenger seat of FIG. 3 in a partially stowed condition with a seatback folded against a seat base.

FIG. 6 depicts the removed passenger seat in the stowed condition with risers folded against an underside of the seat base.

FIG. 7 is a schematic view of a guide of the vehicle seat storage system.

FIGS. 8-11 are side perspective views of the passenger seat in the stowed condition being positioned into a recessed portion defined in an interior sidewall of the vehicle according to a first aspect of the vehicle seat storage system.

DETAILED DESCRIPTION

It should, of course, be understood that the description and drawings herein are merely illustrative and that various modifications and changes can be made in the structures disclosed without departing from the present disclosure. As used herein, lateral directions are transverse across the vehicle, i.e., left and right directions. Likewise, longitudinal directions refer to forward and rearward directions of vehicle travel, and the vertical directions relate to elevation, i.e., upward and downward directions.

Figure 1:
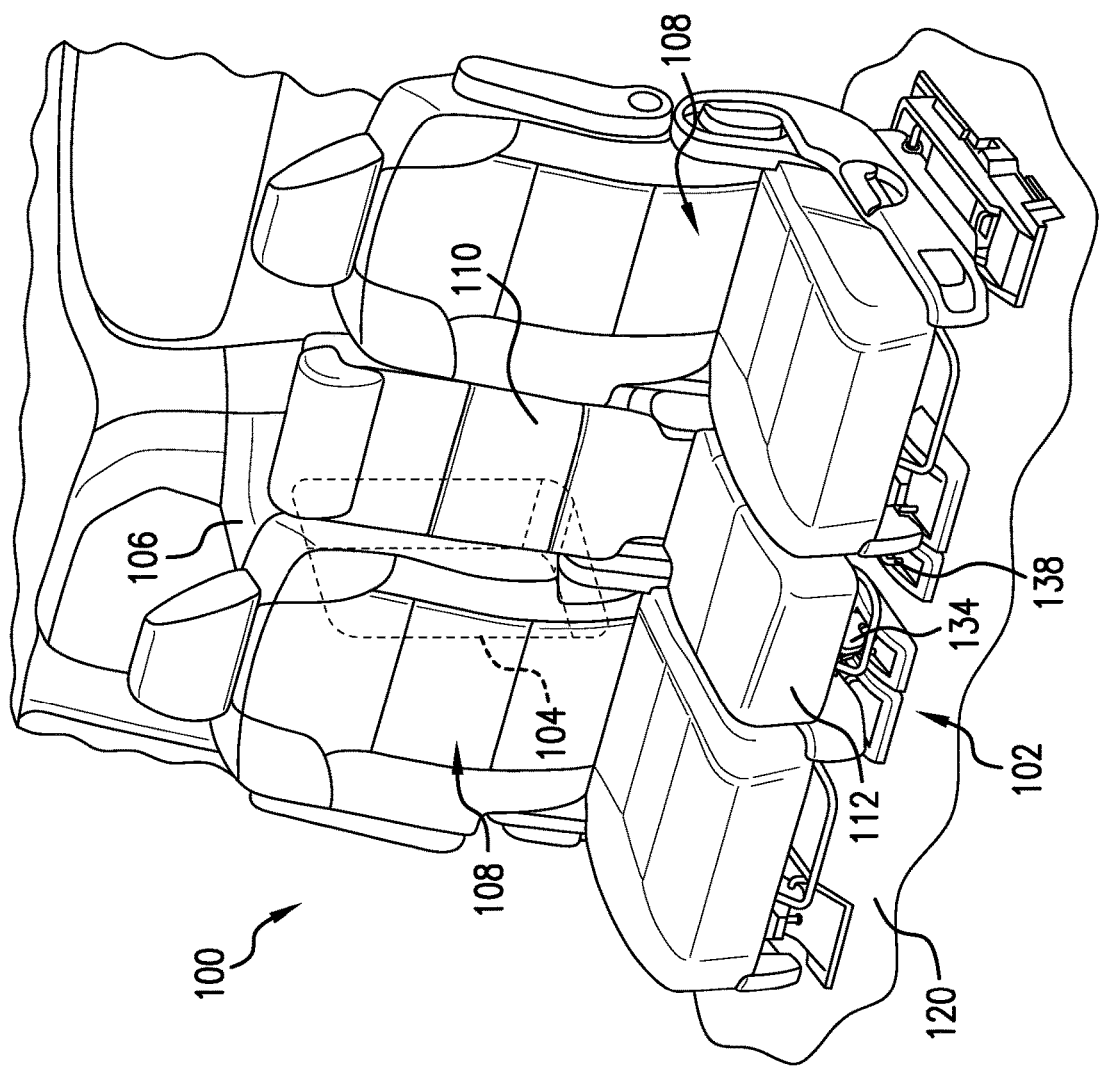
FIG. 1 is a partial view of an interior of a vehicle depicting a seating arrangement for the exemplary vehicle seat storage system.
Figure 11:
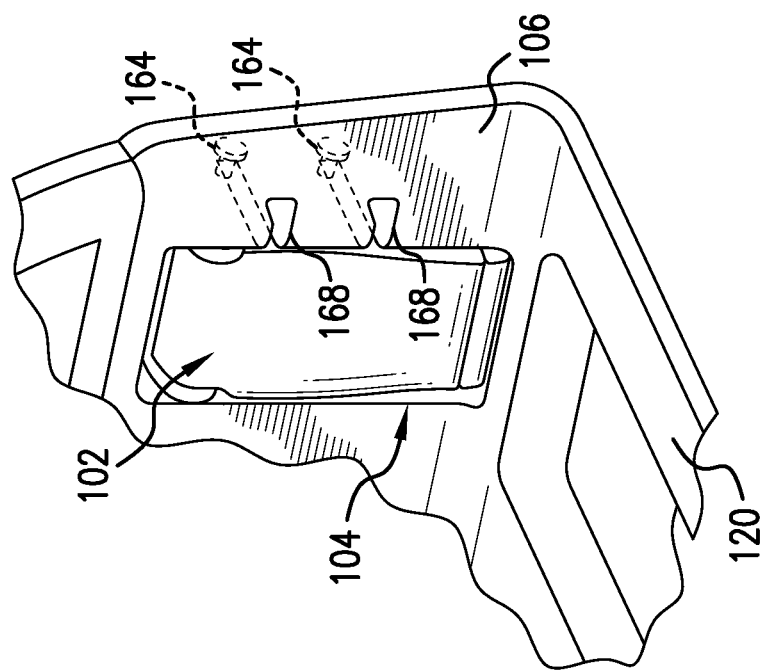
Figure 10:
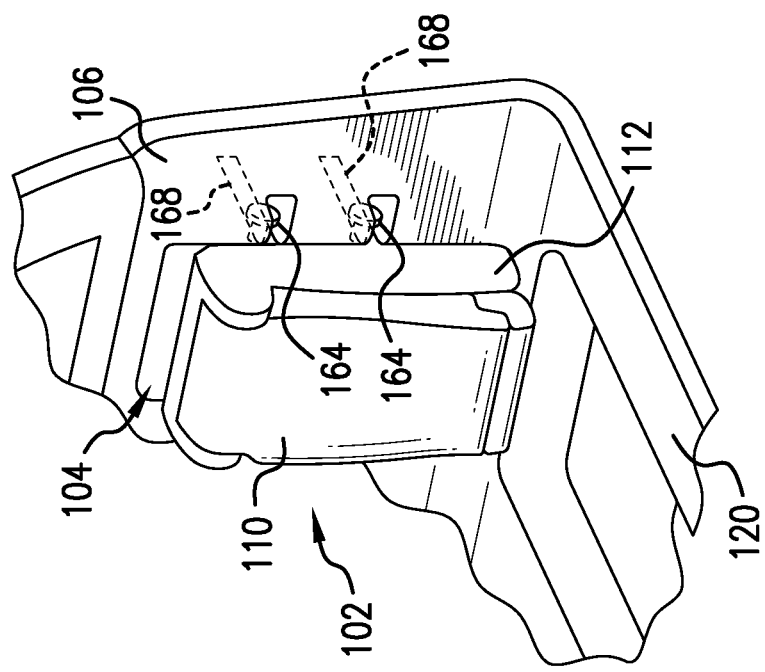
Figure 13:
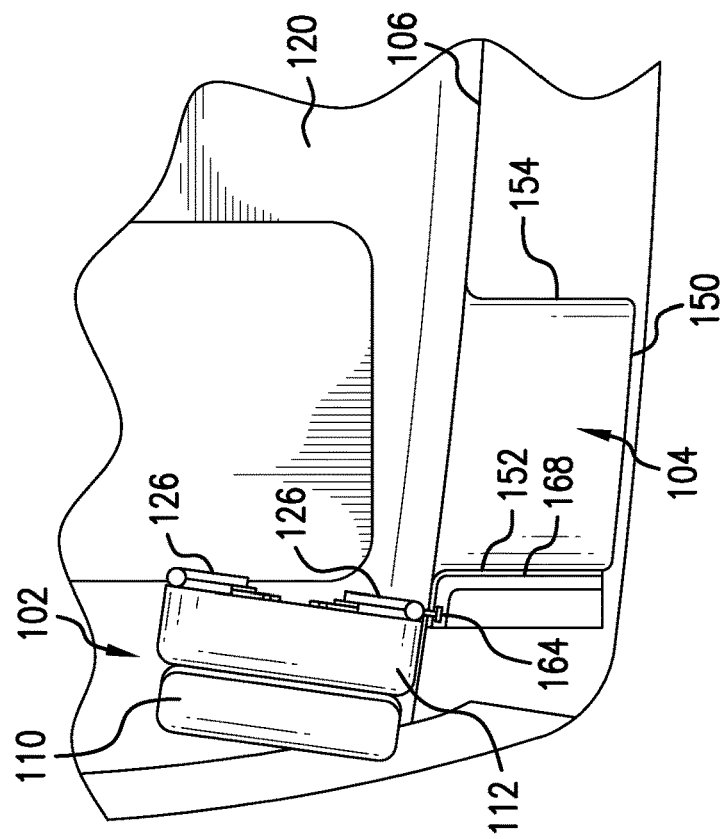
FIGS. 12-15 are top views of the passenger seat in the stowed condition being positioned into the recessed portion according to the first aspect of the vehicle seat storage system.

Referring now to the drawings, wherein like numerals refer to like parts throughout the several views, FIGS. 1 and 2 illustrate a vehicle seat storage system 100 according to the present disclosure. In general, the vehicle seat storage system 100 includes a passenger seat 102 and a recessed portion 104 defined in an interior sidewall 106 of a vehicle which is sized and configured to at least partially receive the passenger seat in a stowed condition of the passenger seat 102. The passenger seat 102 can be part of a seating arrangement wherein the passenger seat 102 is located between outboard seats 108, however this is not required. The passenger seat 102 includes a seatback 110 and a seat base 112 pivotally coupled to the seatback, as is known in the art. As described herein, the term seatback is used generically, and should be interpreted to include structural components of the seatback 110, including a frame, an optional cushion and/or an optional headrest. Similarly, the term seat base is used generically, and should be interpreted to include structural components of the seat base 112, including a frame and an optional cushion. The passenger seat 102 has a seating condition (FIG. 1) where the passenger seat is releasably attached to a floor 120 of the vehicle and the stowed condition where the passenger seat 102 is unattached from the floor 120 and the seat base 112 is foldable against the seatback 110. It should be appreciated that in the stowed condition the seatback 110 and the seat base 112 are folded such that they are arranged substantially parallel to each other. In some instances, the passenger seat 102 is provided with a pivot mechanism (not shown) that allows for the seatback 110 and the seat base 112 to pivot or fold relative to each other. In addition, the pivot mechanism can be configured to maintain the passenger seat 102 in the stowed condition when placing it into and/or removing it from the recessed portion 104.

According to the present disclosure, the passenger seat 102 further includes risers 126 which are pivotally attached to the seat base 112 (see FIGS. 3-6). The risers 126 have a deployed position (FIG. 3) and a folded position (FIG. 6). In the deployed position, the risers 126 are oriented substantially perpendicular to the seat base 112 for supporting the seat base 112 in the seating condition. In the folded position, the risers 126 are folded inwardly against an underside of the seat base 112, which places the passenger seat 102 into the stowed condition. Each of the risers 126 includes a frame 128 pivotally secured to the seat base 112 and latch mechanism 130 mounted to the frame for releasably attaching the passenger seat 102 in the seating condition to the vehicle floor 120. The latch mechanism 130 can include one or more latches (i.e., forward and rear latches 134, 136) that are each engageable with an engaging member (i.e., strikers 138 shown in FIG. 2 for the forward latches 134) that is fixedly attached to the vehicle floor 120. FIG. 3 depicts the passenger seat 102 in the seating condition. To remove the passenger seat 102, the seatback 110 can be first folded against the seat base 112 (FIG. 4). The rear latches 136 can then be released or unlatched from the engaging members on the vehicle floor 120. The passenger seat 102 can then pivot forwardly about the forward latches 134 allowing the passenger seat to be removed from the vehicle floor. Once removed (FIG. 5) the risers 126 can be folded against the seat base 112 (FIG. 6). It should be appreciated that the passenger seat 102 can be released or unlatched from the vehicle floor 120 and then removed without first folding the seatback 110 against the seat base 112 (see FIG. 2).

As indicated above, the interior sidewall 106 of the vehicle includes the recessed portion 104 sized and configured to at least partially receive the passenger seat 102 in the stowed condition. In the depicted aspect of FIGS. 1 and 8, the interior sidewall 106 is an interior trim panel, for example a left rear quarter trim panel or a right rear quarter trim panel. The recessed portion 104 can have an inner wall 150 and oppositely disposed sidewalls 152, 154, each of which can be shaped complementary with the passenger seat 102 in the stowed condition. The interior sidewall 106 further includes a guide 160 configured to direct the passenger seat 102 in the stowed condition into and out of the recessed portion 104 and support the passenger seat 102 in recessed portion 104. Further, in the depicted aspect, one of the risers 126 includes a guide pin 164 configured to be received in the guide 160 of the interior sidewall 106. As shown in FIGS. 3 and 6, the guide pin 164 is positioned on the riser 126 so that in the deployed position the guide pin 164 is concealed by the seat base 112 and in the folded position the guide pin 164 extends outwardly from the riser.

Figure 12:
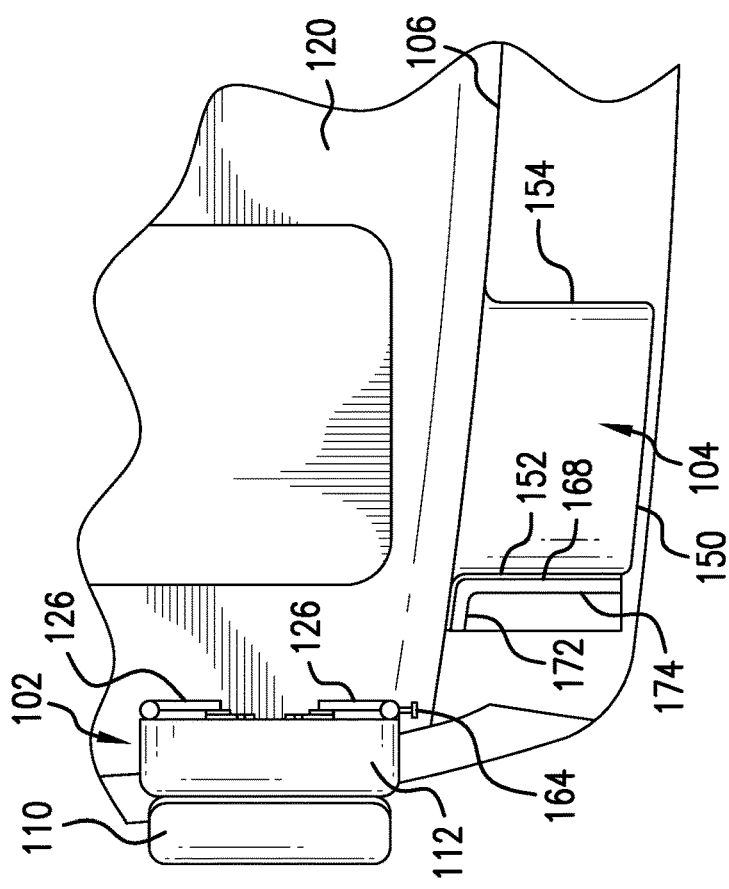
Figure 15:
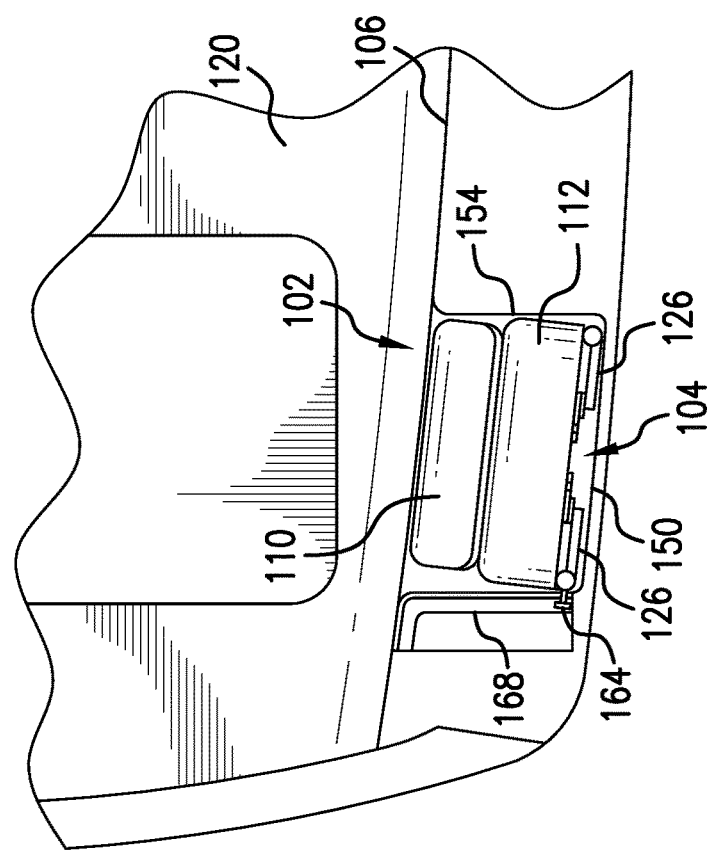
Figure 14:
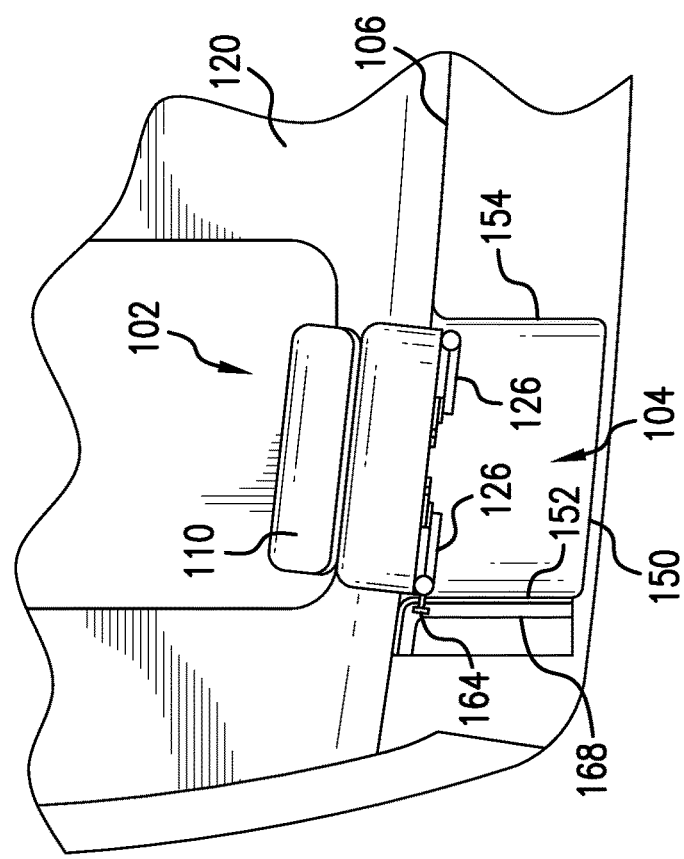

According to one aspect shown in FIGS. 8 and 12, the guide 160 is configured as a slide rail 168 configured to slidably receive the guide pin 164 provided on the riser. It should be appreciated that the slide rail 168 can be formed in the interior sidewall 106 (FIG. 8) or can be a separate component mounted to the interior sidewall 106 (FIG. 12). With reference to FIGS. 7, 8 and 12, the slide rail 168 includes an open-ended first section 172 for receiving the guide pin 164 and a closed-ended second section 174. The first section 172 is located outside of the recessed portion 104 and extends in a vehicle longitudinal direction on the interior sidewall 106. The second section 174 is located within the recessed portion 104 and extends in a vehicle width direction along the sidewall 152. As depicted, the first section 172 is elevated in a vehicle height direction relative to the second section 174, and therefore, the slide rail 168 is downwardly sloped from the first section 172 toward the second section 174. This allows the passenger seat 102 in the stowed condition to easily slide along the slide rail 168 into the recessed portion 104. In the depicted aspect of FIG. 7, the first section 172 can include a first depression 178 sized to receive the guide pin 164. The first depression 178 serves as a hold or stop to temporary retain the passenger seat 102 in the first section 172 as the passenger seat is being loaded by the user, thereby preventing the passenger seat 102 from immediately sliding along the slide rail 168. Further, the second section 174 can include a second depression 182 also sized to receive the guide pin to hold the passenger seat 102 in the recessed portion 104.

FIGS. 8-11 depict the passenger seat 102 in the stowed condition being positioned into the recessed portion 104 defined in the interior sidewall 106 of the vehicle. As described above, the slide rail 168 is formed in the interior sidewall 106 and receives the guide pin 164. With the guide pin 164 in the slide rail 168, the user can easily move the passenger seat 102 into the recessed portion 104. Further, with the downward slope of the slide rail 168, the passenger seat 102 can be securely stowed in the recessed portion 104 without the need for additional devices (e.g., straps, cords, and the like) to hold the passenger seat 102 in place. FIGS. 12-15 also depict the passenger seat 102 in the stowed condition being positioned into the recessed portion 104 via the separate slide rail 168 mounted to the interior sidewall 106.

Figure 17:
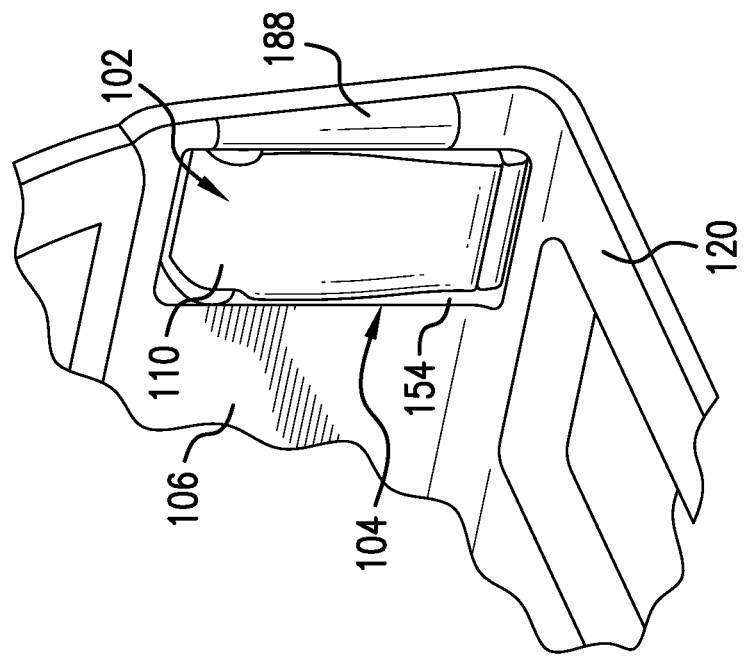
FIGS. 16 and 17 are side perspective views of the passenger seat in the stowed condition being positioned into the recessed portion defined in the interior sidewall of the vehicle according to a second aspect of the vehicle seat storage system.
Figure 16:
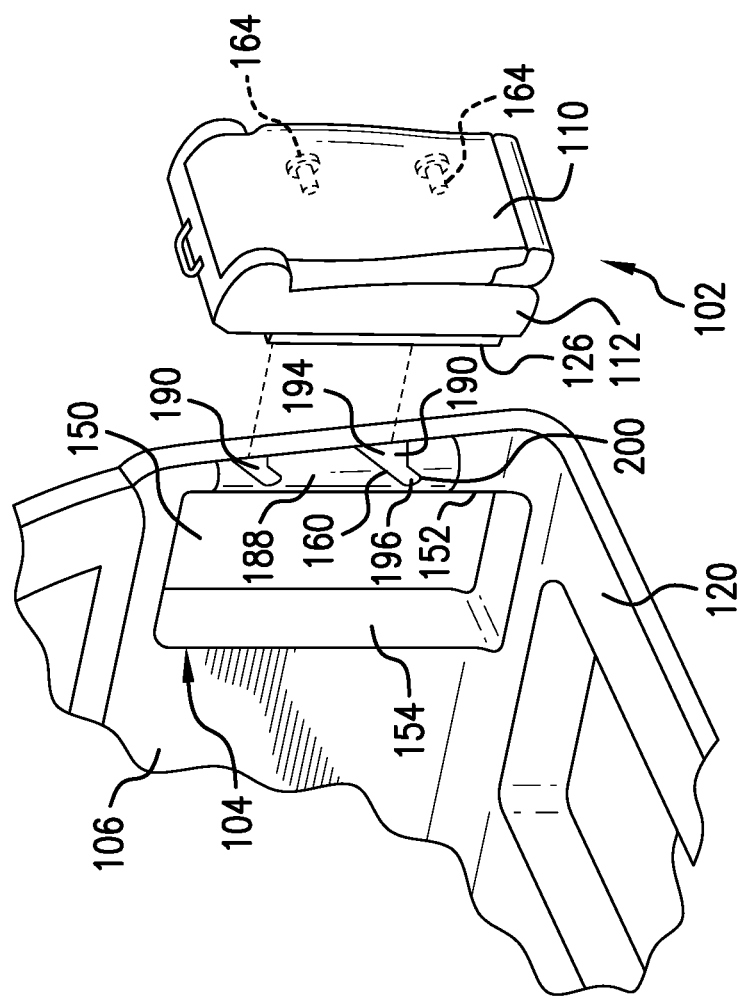
Figure 19:
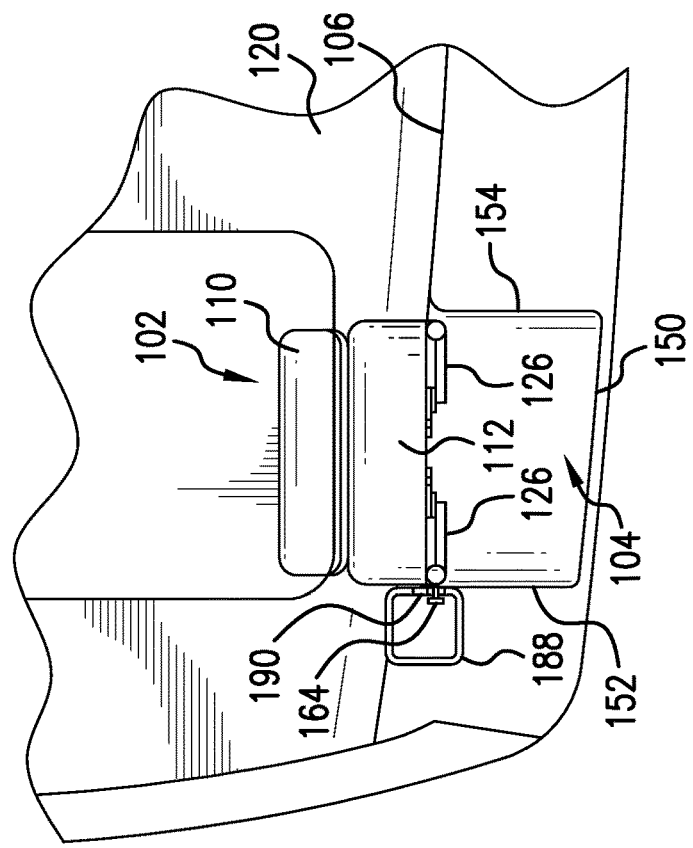
FIGS. 18 and 19 are top views of the passenger seat in the stowed condition being positioned into the recessed portion according to the second aspect of the vehicle seat storage system.
Figure 18:
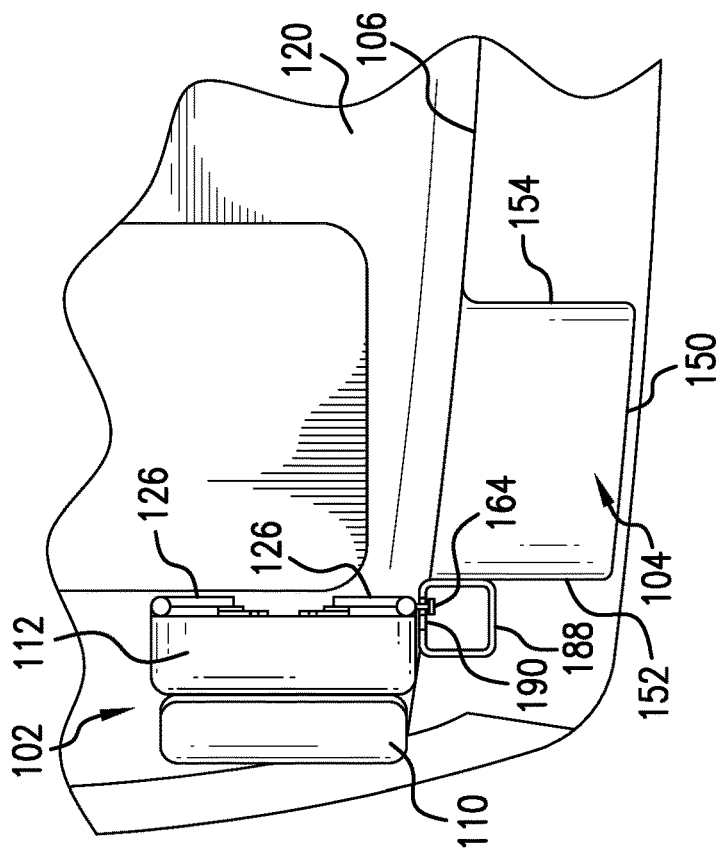

According to another aspect shown in FIGS. 16-19, the guide 160 is located on a guide column 188 that is rotatably mounted on the interior sidewall 106. According to one aspect, the guide 160 is configured as slot 190 formed in the guide column 188 and having an open-ended first section 194 for receiving the guide pin 164 provided on the riser and a closed-ended second section 196 offset downwardly in a vehicle height direction from the first section 194. The second section can be provided with a depression 200 for releasably securing the guide pin 164 within the slot 190. According to another aspect, the guide 160 can be configured as a linear slide rail (not shown) mounted to the guide column 188 and canted downwardly toward the vehicle floor 120. With the passenger seat 102 in the stowed condition mounted to the guide column 188 via the guide pin 164 received in the guide 160 rotation of the guide column 188 positions the passenger seat 102 at least partially within the recessed portion 104 (FIGS. 17 and 19). It should be appreciated that the guide column 188 can be configured to be locked in both a first position with the guide 160 facing toward the interior of the vehicle (FIGS. 18 and 18) and a second position with the guide 160 facing one of the sidewalls 152, 154 of the recessed portion 104 (sidewall 154 in FIGS. 17 and 19). It should also be appreciated that the guide column 188 can be configured to rotate manually by the user and/or rotate automatically by a rotation mechanism (e.g., a stepper motor and gear assembly), as is known in the art.

While in use, the passenger seat 102 can be attached to the vehicle floor 120 and used by one or more individuals that are traveling within the vehicle. In the alternative, the passenger seat 102 can be used to place articles or items on, for example groceries. In the event that space that is occupied by the passenger seat 102 while it is attached to the floor 120 is desired to be used and/or unoccupied by the seat, the passenger seat 102 can be removed or detached from the floor 120 and folded into the stowed condition. After being folded into the stowed condition, the passenger seat 102 can be placed at least partially within the recessed portion 104 on the interior sidewall 106. After the passenger seat 102 has stored, space previously occupied by the passenger seat is available for use, and floor and/or sub-floor cargo space is still available.

According to the present disclosure, a method for storing a passenger seat 102 in a vehicle comprises providing a passenger seat 102 having a seating condition where the seat is releasably attached to a floor 120 of the vehicle and a stowed condition where the passenger seat is unattached from the floor; providing an interior sidewall 106 of the vehicle with a recessed portion 104 sized and configured to at least partially receive the passenger seat 102 in the stowed condition; providing a guide 160 mounted to or formed in the interior sidewall 106 for directing the passenger seat 102 in the stowed condition into the recessed portion 104; folding a seatback 110 of the passenger seat against a seat base 112 of the passenger seat; detaching the folded seat from the vehicle floor 120; mounting the passenger seat in the stowed condition to the guide 160; and moving the passenger seat 102 in the stowed condition into the recessed portion 104 via sliding movement of the passenger seat in the stowed condition along the guide 160. The exemplary method further includes folding risers 126 inwardly against the seat base 112 after the passenger seat 102 is detached from the floor 120, and positioning a guide pin 164 provided on one of the risers in the guide 160 to allow for the sliding movement of the passenger seat in the stowed condition.

It should be appreciated that any term of degree used herein, such as "substantially", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat storage system comprising:
a passenger seat, the seat including a seatback and a seat base pivotally coupled to the seatback, the seat having a seating condition where the seat is releasably attached to a floor of the vehicle and a stowed condition where the seat is unattached from the floor and the seat base is folded against the seatback, the seat further including risers pivotally attached to the seat base, the risers having a deployed position for supporting the seat base in the seating condition and a folded position where the risers are folded inwardly against the seat base in the stowed condition; and
an interior sidewall of the vehicle, the interior sidewall including a recessed portion sized and configured to at least partially receive the seat in the stowed condition, the interior sidewall further including a guide configured to receive the seat in the stowed condition, wherein the seat in the stowed condition is configured to slide along the guide into and out of the recessed portion, and the guide is configured to support the seat in the recessed portion.

2. The system of claim 1, wherein each of the risers includes a latch mechanism for releasably attaching the seat in the seating condition to the vehicle floor, and one of the risers includes a guide pin configured to be received in the guide of the interior sidewall.

3. The system of claim 2, wherein the guide pin is positioned on the one riser so that in the deployed position the guide pin is concealed by the seat base and in the folded position the guide pin extends outwardly from the one riser.

4. The system of claim 2, wherein guide is configured as a slide rail configured to slidably receive the guide pin.

5. The system of claim 4, wherein the slide rail includes an open-ended first section for receiving the guide pin, the first section located outside of the recessed portion and extending in a vehicle longitudinal direction, and a closed-ended second section located within the recessed portion and extending in a vehicle width direction.

6. The system of claim 5, wherein the first section is elevated in a vehicle height direction relative to the second section.

7. The system of claim 6, wherein the slide rail is downwardly sloped from the first section toward the second section.

8. The system of claim 2, wherein the guide is located on a guide column that is rotatably mounted on the interior sidewall.

9. The system of claim 8, wherein with the seat in the stowed condition mounted to the guide column via the guide pin received in the guide rotation of the guide column positions the seat at least partially within the recessed portion.

10. The system of claim 8, wherein guide is configured as slot formed in the guide column and having an open-ended first section for receiving the guide pin and a closed-ended second section offset downwardly in a vehicle height direction from the first section for releasably securing the guide pin within the slot.

11. A vehicle seat storage system comprising:
a passenger seat, the seat including a seatback and a seat base pivotally coupled to the seatback, the seat having a seating condition where the seat is releasably attached to a floor of the vehicle and a stowed condition where the seat is unattached from the floor and the seat base is folded against the seatback; and
an interior sidewall of the vehicle, the interior sidewall including a recessed portion sized and configured to at least partially receive the seat in the stowed condition, the interior sidewall further including a guide, wherein the seat in the stowed condition is configured to slide along the guide in a downward direction toward the vehicle floor to a stowed position within the recessed portion.

12. The system of claim 11, wherein the seat further includes risers pivotally attached to the seat base, each riser includes a latch mechanism for releasably attaching the seat in the seating condition to the vehicle floor, the risers having a deployed position for supporting the seat base in the seating condition and a folded position where the risers are folded inwardly against the seat base in the stowed condition.

13. The system of claim 12, wherein one of the risers including a guide pin configured to be received in the guide of the interior sidewall.

14. The system of claim 13, wherein the guide pin is positioned on the one riser so that in the deployed position the guide pin is concealed by the seat base and in the folded position the guide pin extends outwardly from the one riser.

15. The system of claim 14, wherein the guide slidably receives the guide pin and is configured as a slide rail mounted to the interior sidewall or slot formed in the interior sidewall.

16. The system of claim 15, wherein the slide rail includes an open-ended first section for receiving the guide pin, the first section located outside of the recessed portion, and a closed-ended second section located within the recessed portion, wherein the slide rail is downwardly sloped from the first section toward the second section.

17. The system of claim 15, wherein the slot is formed in a guide column that is rotatably mounted on the interior sidewall, wherein with the seat in the stowed condition mounted to the guide column via the guide pin received in the slot rotation of the guide column positions the seat at least partially within the recessed portion.

18. A method for storing a passenger seat in a vehicle comprising:

providing a passenger seat having a seating condition where the seat is releasably attached to a floor of the vehicle and a stowed condition where the seat is unattached from the floor;

providing an interior sidewall of the vehicle with a recessed portion sized and configured to at least partially receive the seat in the stowed condition;

providing a guide mounted to or formed in the interior sidewall for directing the seat in the stowed condition into the recessed portion;

folding a seatback of the seat against a seat base of the seat;

detaching the folded seat from the floor;

mounting the seat in the stowed condition to the guide; and moving the seat in the stowed condition into the recessed portion via sliding movement of the seat in the stowed condition along the guide.

19. The method of claim 18, wherein the seat further includes risers pivotally attached to the seat base, each riser includes a latch mechanism for releasably attaching the seat in the seating condition to the vehicle floor, and the method includes folding the risers inwardly against the seat base after the seat is detached from the floor.

20. The method of claim 19, wherein one of the risers including a guide pin, and the method includes positioning the guide pin in the guide to allow for the sliding movement of the seat in the stowed condition.

* * * * *